United States Patent
Kaye (10) Patent No.: US 11,524,913 B2
(45) Date of Patent: Dec. 13, 2022

(54) WASTE WATER PURIFICATION SYSTEM

(71) Applicant: Ecotricity Group Limited, Stroud (GB)

(72) Inventor: Peter Kaye, Stroud (GB)

(73) Assignee: Ecotricity Group Limited, Stroud (GB)

( * ) Notice: Subject to any disclaimer, the term of this patent is extended or adjusted under 35 U.S.C. 154(b) by 0 days.

(21) Appl. No.: 16/472,415

(22) PCT Filed: Dec. 22, 2017

(86) PCT No.: PCT/GB2017/053890
§ 371 (c)(1),
(2) Date: Jun. 21, 2019

(87) PCT Pub. No.: WO2018/115907
PCT Pub. Date: Jun. 28, 2018

(65) Prior Publication Data
US 2019/0359511 A1    Nov. 28, 2019

(30) Foreign Application Priority Data

Dec. 23, 2016 (GB) .................................... 1622177

(51) Int. Cl.
*C02F 1/32* (2006.01)
*C02F 3/08* (2006.01)
(Continued)

(52) U.S. Cl.
CPC ................ *C02F 9/00* (2013.01); *C02F 1/32* (2013.01); *C02F 3/082* (2013.01); *C02F 3/104* (2013.01);
(Continued)

(58) Field of Classification Search
CPC .. C02F 3/082; C02F 3/08; C02F 1/283; C02F 3/06; C02F 3/10; C02F 3/101; C02F 9/00;
(Continued)

(56) References Cited

U.S. PATENT DOCUMENTS

| | | | | |
|---|---|---|---|---|
| 443,737 | A | * | 12/1890 | Anderson .............. B01D 24/12 |
| | | | | 210/267 |
| 4,021,347 | A | * | 5/1977 | Teller ................. B01D 29/6438 |
| | | | | 210/195.1 |

(Continued)

FOREIGN PATENT DOCUMENTS

| | | |
|---|---|---|
| CN | 204342500 | 5/2015 |
| CN | 105836885 | 8/2016 |

(Continued)

OTHER PUBLICATIONS

Wang et al., "Enhanced phosphorus removal by microbial-collaborating sponge iron", 2015, Water Sci & Tech, 72.8, 1257-1265. (Year: 2015).*

(Continued)

*Primary Examiner* — Claire A Norris
(74) *Attorney, Agent, or Firm* — Andrus Intellectual Property Law, LLP (57) ABSTRACT

The present invention relates to a water-processing system configured to produce purified waste water. The system comprises an inlet for waste water, one or more biological water-treatment units, and an outlet for purified water. The one or more biological water-treatment units are fluidly connected to the inlet and the outlet. Each of the one or more biological water-treatment units comprises: an inlet for receiving water to be treated, a reactor, an outlet for treated water, and ventilation means configured to provide ventilation to the reactor. The reactor is divided into two or more compartments by one or more screens. Each compartment is (Continued)

in fluid communication with the ventilation means, and comprises a biofilm on one or more surfaces. The reactor is configured to expose at least a portion of the waste water to the biofilm in the presence of air supplied by the ventilation means.

12 Claims, 3 Drawing Sheets

(51) Int. Cl.
  *C02F 3/10* (2006.01)
  *C02F 3/12* (2006.01)
  *C02F 9/00* (2006.01)
  *C02F 103/00* (2006.01)

(52) U.S. Cl.
  CPC ............ *C02F 3/106* (2013.01); *C02F 3/1226* (2013.01); *C02F 2103/001* (2013.01); *C02F 2103/002* (2013.01); *C02F 2103/005* (2013.01)

(58) Field of Classification Search
  CPC ....... C02F 3/106; C02F 3/1226; Y02W 10/10; B01D 24/007; B01D 24/32
  USPC ......................................... 210/619, 297, 283
  See application file for complete search history.

(56) References Cited

U.S. PATENT DOCUMENTS

| 6,908,556 | B2 * | 6/2005 | Sublette | .................. | C02F 1/288 |
| | | | | | 210/615 |
| 7,794,598 | B2 * | 9/2010 | Zaitsev | .................. | C02F 3/201 |
| | | | | | 210/605 |

| 2011/0127215 | A1 | 6/2011 | Gencer et al. |
| 2017/0203986 | A1 | 7/2017 | Ervin |

FOREIGN PATENT DOCUMENTS

| CN | 104291436 | | 9/2016 | |
| DE | 19514931 | | 10/1996 | |
| JP | H07313991 | A | 12/1995 | |
| JP | H09276893 | | 10/1997 | |
| JP | 2001314883 | A | 11/2001 | |
| KR | 20110046230 | A * | 5/2011 | |
| KR | 101147247 | | 5/2012 | |
| WO | WO 9211211 | | 7/1992 | |
| WO | WO-2005123609 | A1 * | 12/2005 | ............... C02F 3/06 |
| WO | WO 2014130042 | | 8/2014 | |

OTHER PUBLICATIONS

Hwan et at, KR20110046230 English Machine Translation, pp. 1-11 (Year: 2011).*
Herve et al, WO 2005123609 English Machine Translation, pp. 1-16 (Year: 2005).*
International Search Report and Written Opinion in corresponding PCT Application No. PCT/GB2017/053890, dated Feb. 27, 2018.
Great Britain Search Report in corresponding GB Application No. 1622177.2, dated Jun. 23, 2017.
Office Action for European Patent Application No. 17825284.7, dated May 19, 2022.

* cited by examiner

WASTE WATER PURIFICATION SYSTEM

CROSS-REFERENCE TO RELATED APPLICATIONS

This application is the U.S. national stage application of International Application PCT/GB2017/053890, filed Dec. 22, 2017, which international application was published on Jun. 28, 2018, as International Publication WO2018/115907 in the English language. The international application is incorporated herein by reference, in entirety. The international application claims priority to GB Patent Application No. 1622177.2, filed Dec. 23, 2016, which is incorporated herein by reference, in entirety.

TECHNICAL FIELD

The present invention relates to a system for purifying waste water and to a biological treatment unit for use in said system.

BACKGROUND

Water is a fundamental requirement of life for everyone on Earth, and rapid growth in global human population, combined with the effects of climate change, is placing a strain on Earth's finite water resources. Less than one percent of the world's water can be used for human needs, and the increased stress being placed on fresh water resources is leading to water scarcity in many parts of the world.

To mitigate against the increasing scarcity of fresh water, improvements in water recycling techniques, particularly improvements in techniques for recycling domestic and commercial waste water, is of particular importance.

Recycling waste water involves the removal of solid particulate matter and then purification processing to produce drinking water. Existing municipal water systems recycle water through sewage treatment and water treatment processes, these processes often being connected to one another via watercourses and aquifers. Firstly, sewage treatment works separate waste sludge from water and subject the water and sludge components to separate treatment processes. The sludge is incinerated, processed in anaerobic plants to produce biogas, used as fertilizer, sent to landfill, etc. The remaining waste water is typically subjected to mechanical, biological and chemical treatment processes that reduce contamination before discharge to watercourses or the sea. In some cases, even in the developed world, waste water is discharged either without treatment or with minimal treatment causing environmental damage and health risks to the human and animal population. Secondly, water is abstracted from watercourses or aquifers and exposed to water treatment processes to produce potable water. The watercourses and aquifers are often partially fed by effluent from sewage treatment works and/or raw sewage. The overall effect of the combination of processes described above is to recycle water even though the components of the system have not been designed with that purpose in mind. The recycling of water from sewage described above is often called unplanned potable reuse.

In areas without mains sewerage, septic tanks are commonly used to process waste water, both on a domestic scale and commercial scale. Septic tanks are typically used domestically when there is no access to a mains sewage system. Traditional septic tanks process waste water by allowing solids within the waste water to settle to the bottom of the tank and allowing light waste (e.g. oils) to float on the surface of the waste water within the tank. In this way, a clarified intermediate water layer forms between the top and bottom waste layers. Additionally, most septic tanks partially biodegrade waste through anaerobic digestion, although some systems use other methods of treatment. The solid waste collected within septic tanks must be emptied and disposed of at regular time intervals. The clarified water within the septic tank is substantially free from large solid particulate matter, but typically comprises fine particulate matter, bacteria, and chemicals such as nitrogen- and phosphorous-containing compounds. Because the clarified water comprises such components it cannot be re-used and is typically allowed to drain into the ground by way of a drain field, which allows the water to seep into the ground.

There is a lack of waste water recycling systems available for use on a non-industrial scale (e.g. commercial or domestic scales). Existing systems rely on the combustion of fuel to purify waste streams via distillation processes or use electricity for pumping in reverse osmosis processes. The downside of these systems is that they are energy intensive. Waste purification systems employing these purification techniques have been established for developing countries. For example, the combustion of biofuels to purify waste streams via distillation. However, such systems rely on the availability of fuel (in some cases biofuel produced from the waste-water) in order for the system to function, and are not practical for domestic use, where a household may not accumulate sufficient waste (for instance, to produce biogas as a fuel) in order to fully utilise their system. There is therefore need for a system which is able to process waste water streams to produce clean potable water for domestic and/or commercial use. There is also need for a system which is able to process waste water streams to produce clean potable water, and which has low environmental impact and low maintenance, servicing and running costs.

It is therefore an object of the present invention to provide a system that is suitable for domestic and/or commercial application, which is able to recycle waste water into potable water. Further objects of the present invention are to provide a system that is suitable for domestic and/or commercial application which is able to recycle waste water into potable water using low amounts of energy, produces no sludge that needs to be pumped out; can operate for long periods between service visits, has compact dimensions and/or works without the need for the external addition of chemicals into the system to remove any bacteria, fine particulates, and chemicals.

SUMMARY OF INVENTION

One aspect of the present invention relates to a biological water treatment unit. The biological water treatment unit comprises an inlet for receiving water to be treated, a reactor, an outlet for treated water, and ventilation means configured to provide ventilation to the reactor. The reactor is divided into two or more compartments by one or more screens, wherein each compartment is in fluid communication with the ventilation means, and comprises a biofilm on one or more surfaces. The reactor is configured to expose at least a portion of the waste water to the biofilm in the presence of air supplied by the ventilation means.

Providing ventilation to the biological water treatment unit enables air to flow in and out of said unit. A supply of air to the biological treatment unit is also required to facilitate biofilm growth and aerobic digestion of particulate matter within the waste stream. The air ventilation means may further comprise one or more heaters and/or one or more blowers.

Preferably, the surface for forming a biofilm is at least a portion of the inner surface of the reactor, and/or at least a portion of the screens. Preferably, the screens are mesh screens, and more preferably a metal mesh such as a stainless steel mesh.

The reactor may further comprise a substrate for biofilm growth, said substrate being contained within the reactor by the screens. The substrate may be made from any suitable material which has a large surface area to support biofilm growth. The substrate may be in the form of a powder or granules. Preferably, the substrate is highly porous, adsorptive and can provide a substrate for biofilm growth. Preferably, the substrate is an activated carbon such as granulated activated carbon (GAC). The substrate may alternatively comprise cristobalite, fired clay, man made materials or mixtures thereof (including mixtures with granulated activated carbon and mixtures that also use a portion of impermeable media such as coal or sand).

Preferably, the substrate fills from 40 to 75% of the volume of each compartment, and more preferably from 55 to 65% of the volume of each compartment.

The one or more screens dividing the space between the compartments are configured to be permeable to the liquid in the waste stream flowing through the reactor, and selectively permeable to solids of a certain size. For example, the screens may only allow solids below 100 µm, 75 µm, 50 µm or 25 µm in size to pass through, thereby enabling both larger contaminants within the waste water and the substrate to be contained in the compartments whilst allowing solids of a certain size within the waste stream to pass through.

Preferably, the substrate has an average particle diameter of 0.15 to 5 mm, more preferably 0.25 mm to 2.5 mm.

Preferably, the substrate has a surface area of from 250 to 5000 square meters per gram of substrate, more preferably 1000 to 3000 square meters per gram of substrate.

Providing a substrate with a large overall surface area (preferably a highly porous substrate), e.g. GAC, helps to remove a broad range of contaminants from the waste stream through physical processes of adsorption and entrapment. GAC is effective in removing contaminants from a waste water stream when the system is first started up, even before a biofilm is established on the surface of the GAC.

It has been found that biofilms formed on the surface of the substrate within the biological unit are able to remove a large proportion of ammonia, carbonaceous content (including hydrocarbons such as oils), and solids. Reduction of biological nutrients such as phosphorus and nitrogen is also achieved.

The biofilms that are formed on the surface of the substrate upon exposure to the waste stream are capable of removing contaminants through surface adsorption. It has been found that the biofilms also biodegrade contaminants that have been adsorbed onto the surface of the substrate. In this way, the biofilms renew the adsorption capacity of the substrate, which would otherwise lose its adsorption efficiency over time due to a lack of active adsorption sites. This process is known as bioregeneration. The bioregeneration means that the substrate within the biological treatment unit does not need to be replaced as frequently as it would in a system relying on physical adsorption properties of the substrate alone.

The reactor of the biological water-treatment unit and/or the screens may be configured to rotate. When the biological water treatment unit is in use and the reactor comprises waste water, rotation of the reactor causes a film of the waste water to be formed on at least a portion of the reactor and/or the screen as the reactor and/or screens rotate through and out of the waste water, thereby exposing the film (which may be formed on the biofilm) to air provided by the ventilation means. The rotation of the reactor and/or screens may be continuous or intermittent.

The substrate (when present) is heavier than water and will tend to amass on the bottom of the reactor. Rotation of the reactor causes friction between the reactor and the mass of substrate lying at the bottom of the reactor thereby raising some of the substrate out of the water. This has the effect of allowing water to drain out of the substrate and advantageously increases exposure of the substrate (and the biofilm attached thereto) to air.

Preferably, the inner part of the reactor is adapted to increase the friction between the substrate and reactor. Even more preferably, the inner part of the reactor comprises adaptations such as ribs or paddles that assist in lifting the substrate as the reactor rotates.

The reactor of the biological water treatment unit may be cylindrical, and preferably tapered in shape. Providing a tapered reactor advantageously allows the process parameters within each compartment (depth of substrate, ratio of section diameter to section length, etc.) to remain in proportion at each stage. This means that the process dynamics are consistent, and therefore the process is easier to predict and control.

Providing a reactor with a powdered or granular substrate and enabling rotation of the reactor has been found to advantageously prevent the screens from becoming blinded by said powder or granular substrate. The rotation of the reactor causes the substrate and the waste water to move within it and thereby agitates biofilms that have formed within the reactor on the internal surfaces, the screens and the substrate, causing excess biofilm to slough off the surface it is on and float off into the waste water. It has been found that this combination of agitation and sloughing advantageously prevents the internal surfaces of the reactor, the screens and the substrate from becoming caked with biofilm. Caking is undesirable as it causes the biofilms to become less effective in removing contaminants. This is because the biofilm has a reduced exposure to both the air above the wastewater that supports biofilm growth and the contaminants contained within the wastewater, thereby reducing contaminant removal. Further, the inner parts of the biofilm clumps suffer from a reduced exposure to oxygen, thereby slowing biofilm growth and thence reducing the rate of bioregeneration.

The biofilm that sloughs off into the waste streams is trapped within the stage in which it became detached by the mesh screens that partition the reactor until it is ground down into fine particles by the milling action of the reactor. These fine particles may then become attached to the substrate or the biofilm where they can be digested by organisms living on the substrate.

The reactor within the one or more biological water treatment units may have any volume, and may vary depending on the unit's intended use. Preferably, the reactor volume is from 1 to 5000 litres.

Another aspect of the present invention relates to a water processing system configured to purify waste water streams, comprising an inlet for waste water, one or more biological water treatment units of the type disclosed herein, and an outlet for purified water. The one or more biological water treatment units are fluidly connected to the inlet and the outlet.

The term "purify" is used herein to describe the treatment of a waste water stream into a treated stream of potable water. The term "waste water" used herein relates to any stream of water containing contaminants such as grey water, rain water or foul sewage.

The system may further comprise one or more mechanical treatment stages configured to mechanically break down particulate matter entering the system via the inlet. The one or more mechanical treatment stages may be located upstream of at least one of the biological water treatment units. Preferably, the mechanical treatment stages are ball mills.

Providing mechanical treatment stages enables the system to break down any solid particulate matter that is present within the waste water stream. It has been found that liquidising or reducing the size of particulate matter present within the waste water stream before processing the waste water stream in the one or more biological water treatment units increases the efficiency of biological breakdown within the biological water treatment units.

The mechanical treatment stages may each optionally comprise one or more filters. Each of the said one or more filters is configured to filter the mechanically broken down particulate matter. Providing one or more filters in this way advantageously only allows particulate matter of a certain size to pass downstream. The filtration means in one or more of the mechanical treatment stages may comprise a filtration screen comprising pores, the size of said pores being configured to only allow particles of a predetermined size to pass though. The pores may be within the range from 5 mm to 0.01 mm, preferably from 2.5 mm to 0.015 mm, more preferably from 1 mm to 0.02 mm. Optionally, if the mechanical treatment stages comprise more than one filter, the size of the pores on the filters becomes progressively smaller along the length of the mechanical treatment stage. For example, if there are three filters (three filter stages) then the pore sizes may be from 5 mm to 1 mm for stage one, from 1 mm to 0.1 mm for stage two, and from 0.1 mm to 0.01 mm for stage three. Preferably, the filter of stage 1 has 1 mm pores, the filter of stage 2 has 0.103 mm pores, and the filter of stage 3 has 0.026 mm pores. The mechanical treatment stages in accordance with the present invention may have any number of filter stages, for example two, three, four, five six, seven, eight, nine, ten etc., and the pore size of the filters of any of these stages may be in accordance with the aforementioned ranges.

The system may comprise one or more chemical treatment units. Preferably, the one or more chemical treatment units are downstream of the one or more biological water treatment units.

The system may further comprise one or more disinfection means configured to disinfect the waste water stream. Preferably, the disinfection means comprises means for exposing the waste water to ultraviolet energy, preferably the disinfection means is configured to expose the waste water to ultraviolet energy through an ultraviolet energy-conducting material, preferably wherein the ultraviolet energy-conducting material comprises glass. The disinfection means may further comprise an aerator configured to aerate the waste water inside the disinfection means. Instead of being configured to expose the waste water to ultraviolet energy, the disinfection means may be configured to provide a disinfection action to the waste stream through one or more of ultrafiltration, microfiltration and/or reverse osmosis.

The system may further comprise a buffer vessel, wherein said buffer vessel is downstream of at least one of the mechanical treatment stages. The buffer vessel advantageously prevents downstream processes from suffering from intermittent changes in the strength (biological oxygen demand, pH, temperature etc.) or flow rate in the waste water stream flowing into the system. For example, if the flow rate of the waste stream temporarily increases suddenly, the buffer vessel can accept the extra flow rate whilst maintaining a steady flow rate entering the downstream water purification components. This advantageously provides a purified water of consistent quality.

The system may further comprise one or more settling tanks for purifying the waste water. Preferably, the one or more of the settling tanks comprise a filter for filtering any particulate matter from the waste water as it passes through the settling tank. Preferably the filter is a cross-flow filter. One or more of the settling tanks may optionally comprise ultraviolet energy-emitting means configured to expose the contents of the settling tank to ultraviolet energy.

The system may further comprise one or more filters downstream of the mechanical treatment stages. Preferably, the system comprises at least one biological filter. Even more preferably, at least one of the filters comprises biological activated carbon or powdered activated carbon.

It has been found that near complete biological digestion is achieved through the use of a combination of biological methods, and near complete biological digestion is achieved by utilising aerobic/anoxic breakdown of the waste water stream in the biological water treatment unit and anaerobic breakdown of the waste water stream in the at least one biological filter.

The system may further comprise a recycle line from the one or more settling tanks to any one of the inlet, the mechanical treatment stages, or the buffer vessel. Providing a recycle line in this way enables any solid particulate matter which has not been digested within a first pass through the system to be processed by the system one or more further times.

The system may further comprise a pressurisation tank comprising a pressurising means configured to pressurise the purified water so that the water is at sufficient pressure to be re-used/reintroduced as a purified water supply e.g. for commercial, domestic or industrial use.

The one or more biological treatment units discussed herein comprise air ventilation means, which enables air to flow in and out of said units. A supply of air to the biological treatment units is also required to facilitate biofilm growth and decomposition reactions to occur and to expel waste gases. The air ventilation means may be further configured to provide ventilation to one or more of the inlet, the mechanical treatment stages, the chemical treatment stages, and the buffer tank. The air ventilation means may further comprise one or more air filters. The air ventilation means may further comprise one or more heaters and/or one or more blowers.

The system described herein may be used as an in-situ system (domestically and/or in certain commercial and industrial applications) for purifying waste water. The purified water can be directly reused, with no additional processing or chemical additives required. Many water treatment processes require the addition of chemicals such as chlorine or chloramine to their treated water to prevent bacterial and viral contamination, thereby making the water safe to drink even if, for example, the water has been sitting in pipework for long periods of time. Some water processing companies add pH-raising chemicals to water so that lead from lead pipework is less readily dissolved into the water. Adding chemicals to water in this way poses a risk to the environment and is costly. There are also various health concerns in relation to the addition of fluorine, chlorine and chloramines in certain concentrations. Advantageously, the system as disclosed herein dispenses with the need for any post process chemical treatment in situations where the water is not going to, for example, pass through a municipal distribution network before use.

The present invention may be carried out in various ways and a preferred embodiment of a biological water-treatment unit and a water treatment system comprising said biological treatment unit in accordance with the present invention will now be described by way of example with reference to the accompanying figures, in which.

DETAILED DESCRIPTION

Figure 1:
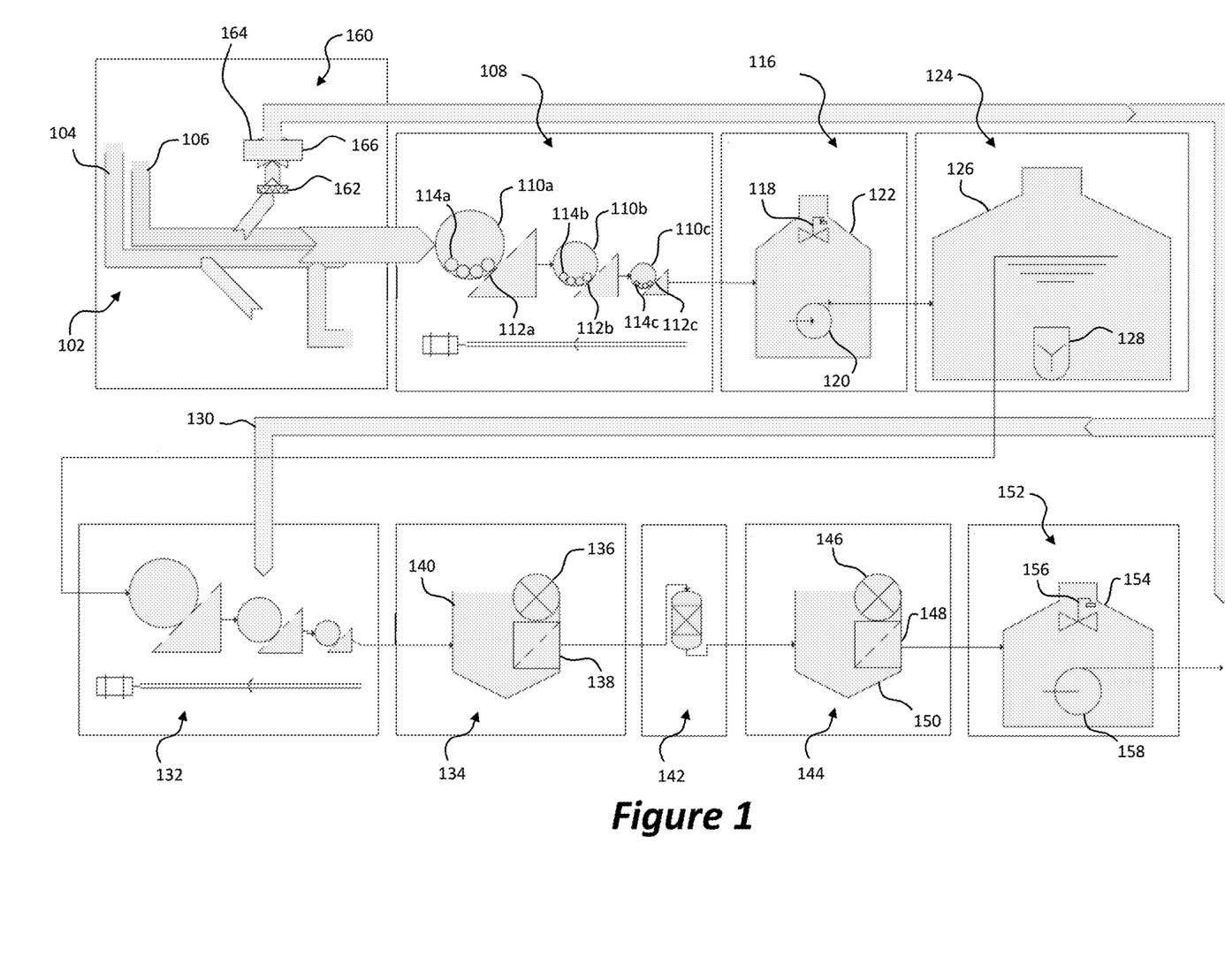
FIG. 1—Is a flow diagram showing a section of a waste water system in accordance with the present invention.
Figure 2:
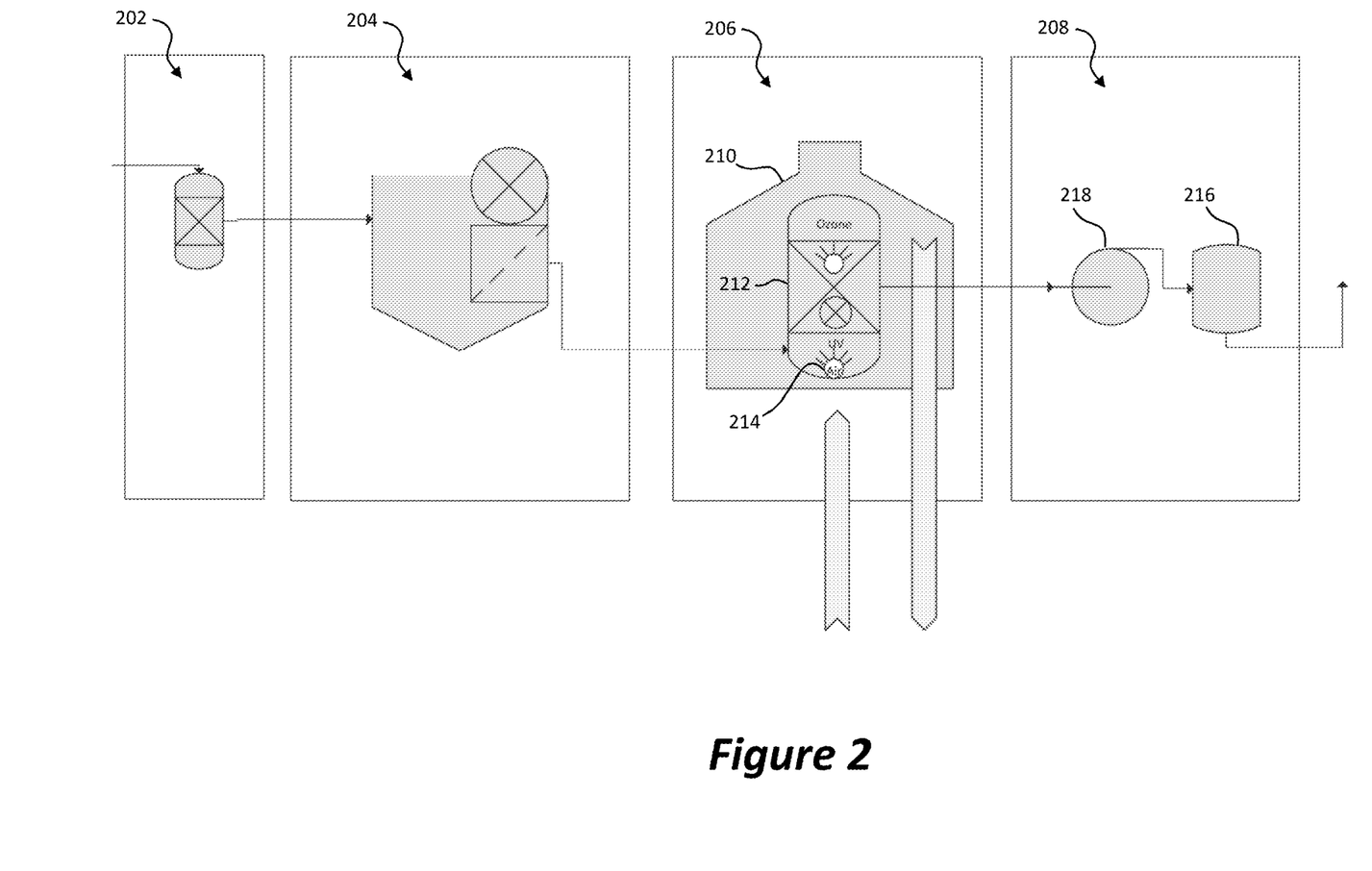
FIG. 2—Is a flow diagram showing a section of a waste water processing system in accordance with the present invention.

A waste water processing system in accordance with the present invention is shown generally in FIGS. 1 and 2. The system shown in FIGS. 1 and 2 is shown in two distinct aspects, a primary processing aspect (an example of which is shown in FIG. 1), and a purification aspect (an example of which is shown in FIG. 2). The primary processing aspect is configured to receive a waste stream and to provide physical and biological breakdown to any particulate matter present. The purification aspect is configured to provide additional disinfection to the waste stream that has been processed by the primary processing aspect. The primary processing and purification aspects described herein in relation to the system of the present invention are not limited to being part of the same unit and may, for example, be separate communicating units. The system is also not limited to having such primary processing and purification aspects, and the components thereof are not limited to the arrangement shown in FIGS. 1 and 2.

Waste water and air are received by the system via an inlet module, which shown generally at item 102. The inlet module 102 comprises a waste water inlet 104 and a rainwater inlet 106.

The waste water inlet 104 and the rainwater inlet 106 are shown as separate inlets on FIG. 1. However, they are not limited to being separate, and waste water and rainwater may alternatively be received by the inlet module 102 via a single inlet line. It is not essential for the system to receive both waste water and rain water, and the system may be configured to only receive waste water or rain water.

The waste water inlet 104 may be connected to any number of waste water ducts (e.g. domestic sewage ducts), which may be, for example, connected to household waste water from sinks, showers, baths and toilets, or, waste water from the same sources within commercial buildings such as hotels, shops and offices. The rainwater inlet 106 may be connected to any rain water capture devices, for example gutters, rainwater tanks or other rainwater drainage/collection systems.

The waste water inlet 104 and the rainwater inlet 106 of inlet module 102 merge together and are fluidly connected to a downstream milling unit, which is shown generally at item 108. The merging together of the waste water inlet 104 and the rainwater inlet 106 causes any waste water and rain water within the inlets to mix together. The mixture formed will hereinafter be referred to as the "waste stream". It is not essential for the waste water inlet 104 and the rainwater inlet 106 to merge together before entry to the milling unit 108, and they may alternatively feed directly into the milling unit 108 separately.

Rainwater inlet 106 also functions as an inlet to allow air to flow to supply ventilation system within the water processing system, which is shown generally at item 160. The ventilation system 160 comprises an air filter 162, air blower 164 and heater 166, and ducting 168 that is configured to connect the ventilation system 160 to various aspects of the water processing system and thereby provide an air (oxygen) supply. The ventilation system 160 also allows gases to escape from the water processing system. The ducting 168 is shown on FIG. 2 to be connected to the biological water treatment unit 132 and the disinfection and storage system 206. However, the ducting 168 is not limited to only being connected to these components, and may alternatively be connected and provide air to any of the other components of the system (e.g. the milling unit 108, the biological filters (142, 202), the clarification/filtration units (134, 144, 204), or the equalisation tank 124). The ducting 168 may optionally only be connected to the biological treatment unit 132.

It is not essential for the ventilation system 160 to be fitted with an air blower 164, and/or heater 166. The need for a heater depends on where the system is to be operated, and it is possible that a heater is not required if the system is to be used in warm climates.

The milling unit 108 (known as a shoreline mill) is configured to physically break down solids within the waste stream by way of a series of three wet ball mill stages (110a, 110b, and 110c), each of which are separated by a filtration screen (112a, 112b, and 112c). The shoreline mill 108 receives the waste stream from the inlet module 102.

The milling unit 108 is not limited to only having three wet ball mills, and may alternatively comprise any number of wet ball mills (e.g. 1, 2, 4, 5, 6, 7, 8, 9, 10 etc.).

Each wet ball mill (110a, 110b, and 110c) comprises a hollow cylindrical shell which rotates about an axis. The axis of the shell may be either horizontal or at an angle to the horizontal. The hollow cylindrical shell is loaded with a grinding material (114a, 114b, 114c) (e.g. balls), and as the shell rotates the grinding material is lifted up on the rising side of the shell and then falls down and drop to the bottom of the shell. In doing so, any solid particles (within the waste stream) that are located in between the balls and shell are reduced in size by the action of the grinding material. The hollow cylindrical shell and the filtration screens are fitted with perforations which only allow solid matter of a certain size to pass through. The perforations on each of the three filtration screens are progressively finer, and in this way, the series of wet ball mills gradually reduce the size of any solid particulate matter within the waste stream. A fine abrasive material such as sand is used in the final stage as a last size reduction process.

The shoreline mill 108 is in communication with a downstream waste stream sump, which is shown generally at item 116. The waste stream sump 116 is positioned generally below the shoreline mill 108, and receives the waste stream that has been processed by the shoreline mill 108.

The waste stream sump 116 comprises a storage vessel 122, a level sensor 118 (e.g. a float switch) and a pump 120. When the level sensor 118 detects that the level of the waste stream within the sump vessel 122 has reached a predetermined level, the pump 120 is activated and pumps the waste stream which has been processed by the milling unit 108 to a downstream buffer system (known as an equalisation system).

The equalisation system is shown generally at item 124, and comprises a tank 126, and a mixer 128. The equalisation system 124 is connected to a downstream biological treatment unit via line 130. The biological water treatment unit is shown generally at item 132.

Figure 3:
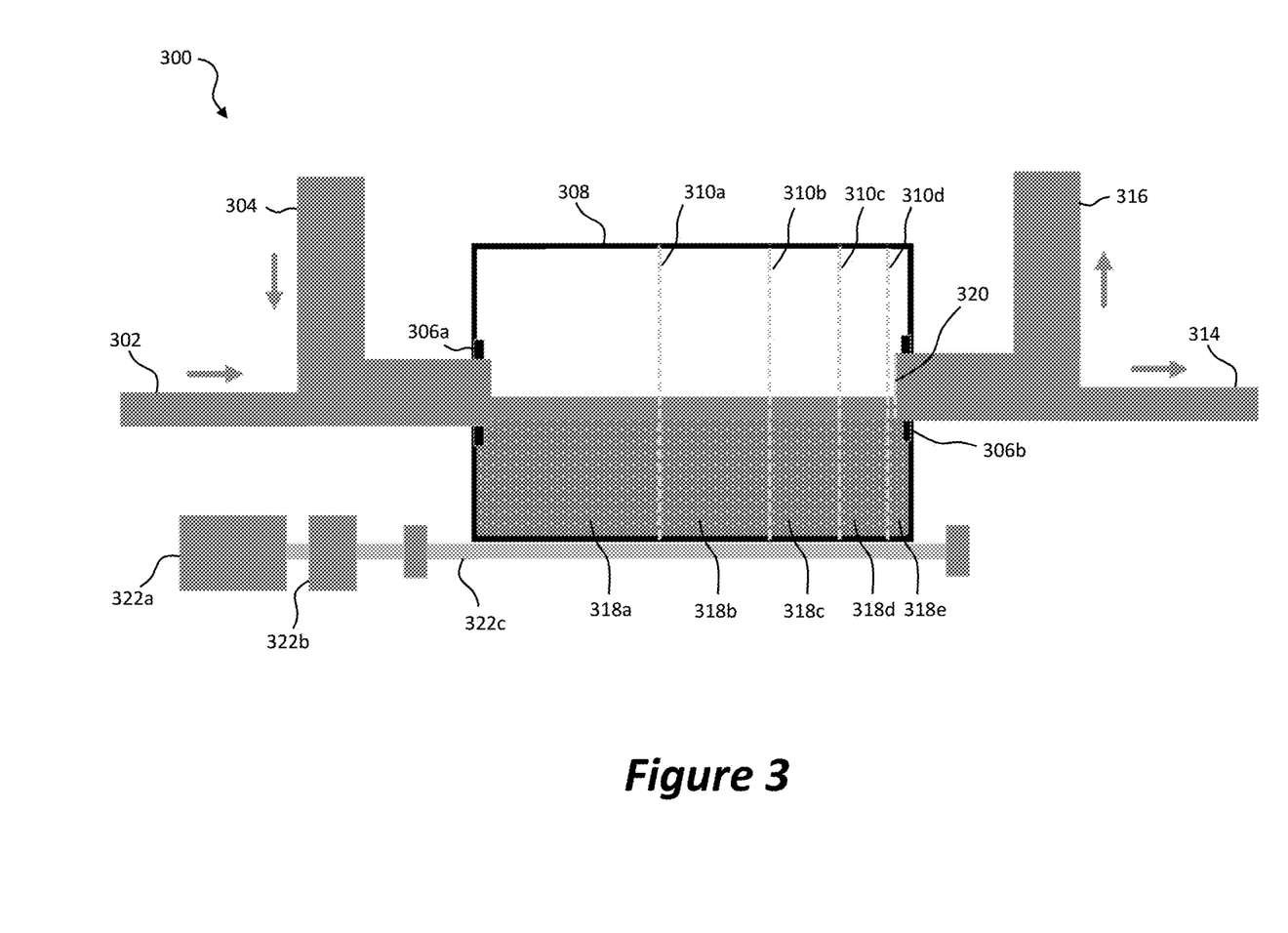
FIG. 3—Is a diagram of a biological water treatment unit in accordance with the present invention.

The biological treatment unit 132 is shown in more detail in FIG. 3, where it is shown generally at item 300. The biological treatment unit 132 is configured to remove particulate matter from waste streams by using a combination of aerobic digestion with microorganisms and filtration techniques.

A waste stream enters into a rotating drum 308 of the biological treatment unit 300 via a waste stream inlet 302. An air inlet 304 joins the waste stream inlet 302, and allows air to flow into the rotating drum 308. The air inlet 304 is in communication with the ventilation system 160. The waste stream inlet 302 is positioned in the centre of one end of the rotating drum 308, so as to allow the rotating drum 308 to rotate whilst staying connected to the stationary waste stream inlet. A waste stream outlet 314 is connected to the rotating drum 308 and allows the waste stream to exit the biological treatment unit 300 once it has traveled through the rotating drum. The waste stream outlet 314 is positioned on the rotating drum 308 opposite to the waste stream inlet 302. The rotating drum 308 may be angled so that the outlet 314 is at a lower vertical height compared to the inlet, so as to allow liquid to flow from the inlet 302 through the rotating drum 308, and out through the outlet 314.

The rotating drum 308 is fitted with seals 306*a* and 306*b* which form a fluid-tight seal between the waste stream inlet 302 and the rotating drum 308, and between the waste stream outlet 314 and the rotating drum 208, thereby allowing the rotating drum 308 to rotate whilst preventing any of the waste stream from leaking from the biological treatment unit 300. Seals 306*a* and 306*b* may be any suitable seal which allows the rotating drum 308 to rotate and prevent waste stream leaks. For example, the seals could be rotary seals. An air outlet 316 is connected to the waste stream outlet 314. Air outlet 316 is connected to the ventilation system 160 and is positioned so as to allow air to flow from the air inlet 304 and out of the biological treatment unit 300 via the rotating drum 308.

The waste stream to be treated is fed into the rotating drum 308 of the biological treatment unit 300 by the equalisation system 124 at a flow rate suitable to ensure that the liquid level within the rotating drum stays constant (i.e. the equalisation system acts as a buffer system in relation to the flow rate of the waste stream). In this way, the liquid level of waste water to be treated inside the rotating drum 308 is kept below the level of the waste stream inlet 302 to prevent the waste stream from flowing out of the rotating drum 308 through the inlet 302. In other words, the waste stream fills the rotating drum 308 to the level of the waste stream inlet 302.

The equalisation system 124 can be used, to a limited extent, to control the strength of the waste water (e.g. biological oxygen demand, pH, etc.) within the system. Any intermittent changes in the strength in the waste water stream flowing in the system can be adequately balanced by the equalisation system 124, which acts as a buffer system due to its volume.

The rotating drum 308 is divided into five compartments (318*a*, 318*b*, 318*c*, 318*d*, 318*e*) by way of four mesh screens (310*a*, 310*b*, 310*c*, and 310*d*), which span across an entire cross-section of the rotating drum, the cross section being perpendicular to the longitudinal axis of the rotating drum. The mesh screens 310*a*, 310*b*, 310*c*, and 310*d* get progressively finer along the length of the rotating drum 308. A final mesh screen 320 is positioned over the exit of the rotating drum 308 and at the entrance of the waste stream outlet 314.

The rotating drum 308 is not limited to having only five compartments, and may have more or fewer compartments. For example, the rotating drum 308 may be divided by mesh screens to form 2, 3, 4, 6, 7, 8, 9, 10 etc. compartments.

The biological treatment unit 300 is provided with a motor 322*a* and a gearbox 322*b*, which are configured to rotate driveshaft 322*c*. Driveshaft 322*c* is configured to be connected to the rotating drum 308 so that when it is rotated, the rotating drum 308 also rotates. The mesh screens 310*a*, 310*b*, 310*c*, and 310*d* rotate with the rotating drum 308, and are therefore stationary with respect to the rotating drum 308 when it is rotated.

Each of the compartments 318*a*, 318*b*, 318*c*, 318*d*, and 318*e* is loaded with granular activated carbon (GAC), which can remove contaminants through adsorption and entrapment whilst also acting as a substrate for microorganisms to grow on, thereby forming a biofilm. The inner surface of the rotating drum 308 and the mesh screens 310*a*, 310*b*, 310*c*, and 310*d* also act as a surface for microorganisms to grow on. The GAC mixes with the waste stream inside each of the compartments to form a slurry mixture. The compartments act to retain particulate above the pore size and the GAC.

GAC is heavier than water and will tend to amass on the bottom of the drum. Rotation of the reactor causes friction between the drum and the mass of substrate lying at the bottom of the drum thereby raising some of the substrate out of the water. This has the effect of allowing water to drain out of the substrate and exposing the substrate and the attached biofilm to air. The inner part of the drum has paddles that run along the length of the inner wall of the drum assist in lifting the substrate as the drum rotates. The paddles extend 20 mm from the wall of the drum and are 4 mm wide. Although they are preferable, it is not essential to the present invention that paddles are used. Other adaptations to the inner face of the drum such as scoring or ribs may be used in addition to the paddles or as alternatives to the paddles to lift the GAC out of the water.

The present invention is not limited to only the use of GAC as a substrate for microorganisms to grow on. Any other adsorptive substrate that is heavier than water and is capable of supporting the growth and formation of microorganisms may be used. For example, one or more of cristobalite, fired clay, or man made materials (round or specially shaped, porous, selectively permeable), may be used in addition or instead of GAC. Such substrates could be used in combination with impermeable substrates such as coal and sand.

The compartments 318*a*, 318*b*, 318*c*, 318*d*, and 318*e* of the biological treatment unit 300 shown in FIG. 3 get progressively smaller in volume along the length of the rotating drum 308 from the first compartment (318*a*) to the last compartment (318*e*). The progressive reduction in volume of the compartments reflects the fact that a large proportion of the nutrients within the wastewater stream required for biofilm growth are used up at each step within the process, so a smaller amount of biofilm will grow on the GAC in the later compartments. As a result of this, each successive stage (compartment) of the biological treatment unit requires less GAC and a smaller volume.

The rotating drum 308 shown in FIG. 3 is substantially cylindrical, thus having parallel sides. The volume of the compartments 318a, 318b, 318c, 318d, and 318e is determined by the spacing of the mesh screens 310a, 310b, 310c, and 310d. The rotating drum 308 is not limited to being a cylinder with parallel sides, and may alternatively be a tapered cylinder, with the end with the larger diameter being at the input side of the biological treatment unit 300. In this way, the compartments formed by the mesh screens will reduce in volume along the length of the rotating drum 308 when the mesh screens are evenly spaced apart. Alternatively, the decreased volume of the compartments may be achieved by using a tapered rotating drum 308 and by positioning the mesh screens so there is a progressive reduction in distance between the compartments (or a combination of these two variations).

When waste water streams are passed through the biological water treatment unit (132, 300) the process conditions are conducive to the formation of microorganism biofilms, which adhere on surfaces within the biological water treatment unit and on the surface of any GAC. The biological water treatment unit is configured to expose the biofilms to water contaminants such as chemicals, bacteria, and/or particulate matter within the waste stream in the presence of oxygen, thereby degrading (digesting) the contaminants aerobically using the microorganisms in the biofilm.

The biofilms that form on the internal surfaces of the biological water treatment unit (132, 300) and on the surface of any substrate such as GAC include a myriad of bacteria (both filamentous and unicellular), as well as metazoa, protozoa and bacteriophage. Among the most dominant is sphaerotilus (known as "sewage fungus"). Sphaerotilus, and the any types of unicellular bacteria that form on the GAC act to remove and transform contaminants from the waste stream. Other filamentous forms, such as beggiatoa, fusarium, nocardia, cladothrix, and oscillatoria may also be formed on the GAC.

Each of the compartments 318a, 318b, 318c, 318d, and 318e are configured to have different specialisations. Non-filamentous forms will be present in the early compartments (e.g. zoogloea, unicellular algae, unicellular rods, spirilla, and spirochetes). The latter compartments will comprise streptomyces and arthrobotrys in addition to the forms present in the earlier compartments. The types of organism and their distribution within the treatment unit will vary from site to site according to the composition of the waste water influent.

The biofilm has been found to automatically propagate from the waste water within the compartments (318a, 318b, 318c, 318d, and 318e) and live off nutrients provided by the waste water stream. The growth and sustainment of the biofilm is controlled by: the GAC substrate platform; the oxygen supplied to the biological treatment unit 300 by the air supply system 160; the content of the waste-water; the flow rate of the waste-water; the rotational speed of the drum and controlling the temperature of the oxygen by using the air heater 166 to avoid freezing temperatures.

It is believed that at each stage, contaminants are selectively removed from the waste stream by a complex ecosystem of organisms contained within the biofilm. These organisms produce water, and other waste liquids, solids and gases. Any organisms that die will slough off the substrate into the waste water. Any contaminants within the wastewater that are too large to pass through the next mesh screen will remain within their compartment unless or until the milling action of the process (resulting from an abrasive environment created by the substrate) physically breaks them down and they are subsequently processed along with other contaminants within the waste water. All of the waste products small enough to pass through the screen move downstream to the next stage, providing that stage with a different environment for microbial growth than the last in terms of the nutrients contained within the waste water and the gases available in the air stream. This is why different bacteria thrive within each successive stage. The process continues at each step until most of the contaminants are transformed (into water, waste gases, minerals) or become trapped within the biofilm or substrate. Eventually this process reaches a stage where there is insufficient food to support any significant biofilm growth and the wastewater can be said to be sufficiently cleansed (in so far as the processing in the biological water treatment unit is concerned).

It has been found that the target operating temperature for the air within the biological water treatment unit is within a range from 10° C. to 35° C. Preferably, the biological water treatment unit is provided with heating means so that the temperature can be controlled within this range. Preferably, the heating means controls the temperature by using a heater and a fan to circulate warm air inside the biological treatment unit. Preferably, a control system is used to automatically activate the heating means when the temperature goes below the range given above. Preferably, when the temperature goes higher than the range given above, a control system automatically increases the air fan speed of the ventilation means, thereby causing a reduction in temperature within the range given above.

Alternatively, the biological treatment unit may be inoculated with bacteria prior to commissioning the system.

The biological treatment unit 132 is in communication with a downstream first clarification/filtration unit 134 (which may also be referred to as a settling tank). The first clarification/filtration unit 134 comprises a tank 140 suitable for holding the effluent from the biological treatment unit 132, an ultra violet emitting device 136 configured to expose waste stream present within the tank 140 to ultraviolet radiation, and a filter 138. Exposing the waste stream to ultra violet energy has a disinfecting action on the waste stream and the surfaces of the tank and filter that are exposed to it. Waste stream within the tank 140 must pass through the filter 138 before exiting the first clarification/filtration unit 134.

As an alternative to the ultra violet emitting device 136, the clarification/filtration unit 134 may comprise ultrafiltration, microfiltration or reverse osmosis means (not shown in the FIGS.), to provide a disinfecting action to the waste stream. Alternatively, ultrafiltration, microfiltration or reverse osmosis means may be provided in addition to the ultra violet emitting device 136.

The first clarification/filtration unit 134 is in communication with a downstream biological filter 142. Biological filter 142 comprises an activated carbon filter column with an automatic backwashing facility.

The backwashing facility uses pressurised water from the purified water stream produced by the system in combination with backflow preventers, automatic valves and dedicated pipework to flush debris from the filters within the system. The backwash facility is electronically controlled to operate when required based on settings specific to each filter such as the expected rate of filter blinding, the actual flow rates since the last wash and the time elapsed since the last wash.

After passing through the biological filter 142, the waste stream flows downstream to a second clarification/filtration unit 144. The second clarification/filtration unit 144 is identical to the first clarification/filtration unit 134, and comprises a tank 150 suitable for holding the effluent from the biological filter 142, an ultra violet emitting device 146 configured to expose waste stream present within the tank 150 to ultraviolet radiation, and a filter 148. Waste stream within the tank 150 must pass through the filter 148 before exiting the second clarification/filtration unit 144.

The second clarification/filtration unit 144 is in communication with a downstream holding tank, which is shown generally at item 152. The holding tank 152 comprises a tank 154, float switch 156, and a pump 158.

The holding tank 152 is in communication with a downstream purification system, shown generally at item 200 of FIG. 2. The purification system 200 comprises a biological filter 202, clarification/filtration system 204, disinfection and storage system 206, and pressurisation system 208.

The biological filter 202 is the same as biological filter 142, and receives the waste stream from the upstream holding tank 152. The clarification/filtration system 204 is the same as the first and second clarification/filtration systems 134 and 144 respectively, and receives the waste stream from the upstream biological filter 142.

The disinfection and storage system 206 receives the waste stream from the upstream clarification/filtration system 204. The disinfection and storage system 206 comprises an outer tank 210, an inner tank 212, and an ultra violet (UV) emitting device 214. The inner tank receives the waste stream from clarification/filtration system 204. The outer tank 210 and inner tank 212 are in communication with the air supply system 160, and are configured to expose oxygen within the air to UV radiation from the UV emitting device 214, thereby forming ozone. The ozone is mixed with the waste stream inside the inner tank 212 using an aerating device.

The disinfection and storage system 206 is in communication with the downstream pressurisation system 208. The pressurisation system 208 comprises a pump 218 and a pressure vessel 216. The pressure vessel 216 is able to maintain the purified water stream downstream of the pump at high pressure so that the treated waste stream is ready for re-use when needed by a user.

The system as described herein may comprise any number of flow meters, temperature sensors, pressure sensors, pumps, control valves, heating elements, heat exchangers, and/or water quality sensors (including sensors for detecting levels of pH, conductivity, dissolved solids, etc.), which may be positioned at any part of the system disclosed herein. A controlling device may be provided to the system to control pumps, heaters, control valves to control fluid flow (and air) rates, fluid (and air) flow direction and/or fluid (and air) temperatures. Such a controlling device may be configured to provide control to the system manually based on a user's instructions entered into a control panel on the system, and/or automatically based on information received from any of the aforementioned sensors/meters. The system may also comprise communication means configured to transmit system data from one or more of said aforementioned sensors and/or meters to a wired and/or remote electronic device. The system may also comprise a receiver capable of communicating with the controlling device, thereby enabling the system to be controlled remotely by a remote control device such as a computer. A remote control device may be configured to communicate with the system over a wireless network. The system as described herein may additionally comprise an interlock system configured to communicate with one or more of the aforementioned sensors and/or meters and override any instructions which may cause harm to the system, users of the system or the surrounding environment. For example, in a case where instructions were received by the receiver which, if carried out, would critically reduce efficiency of the purification process, then the interlock system could be configured to prevent such instructions from being carried out by the system. The interlock system may also, for example, communicate with level sensors and raise an alarm and/or purge waste water from the system in the event of a high level in any of the system components. The interlock system may also be employed to prevent purified water from exiting the system from the pressurisation system 208 if inadequate water quality is detected by a water quality sensor in, for example, the pressurisation system 208 or the disinfection and storage system 206.

The system described above operates in the following way. Waste water and/or rainwater enter the system through the waste water inlet 104 and/or the rainwater inlet 106 respectively. The waste water and/or rainwater are fed into the milling unit 108, which physically breaks down (liquidises) any solid particulate matter within the waste stream, thereby forming a slurry comprising the liquidised solid particulate matter. The effluent of the milling unit collects within the waste water sump 116. Once a suitable amount of slurry has collected within the sump 116, the slurry is pumped to the equalisation tank 124. The mixer 128 within the equalisation tank 124 ensures the slurry is maintained in a homogeneous form.

The equalisation tank 124 feeds the slurry at a controlled flow rate to the biological water treatment unit (132, 300) which uses biofilms to subject the slurry to aerobic processing, thereby digesting solid matter. GAC present within the compartments of the biological water treatment unit also removes contaminants through adsorption and entrapment mechanisms. The mesh screens 310a, 310b, 310c, and 310d that divide compartments 318a, 318b, 318c, 318d, and 318e prevent solid matter of certain sizes from travelling through to later compartments before they have been digested to a certain size and also retains the distinct mix of biofilm within each compartment by retaining the GAC substrate that it inhabits.

The effluent from the biological treatment unit (132, 300) is substantially free from solid particulate matter, chemicals and bacteria. To purify the waste water further, the waste water is fed through clarification/filtration unit 134, biological filter 142, and clarification/filtration unit 144 in series. The clarification/filtration unit 144 then feeds the processed waste water to the holding tank 152.

During operation, any solid particulate matter separated from the waste water by any of the clarification/filtration units and/or biological filters may be recycled back to the milling unit 108 via recycle lines (not shown in the figures). In this way, any particulate matter not digested from a first pass through the system is passed through the system a second time, and successively until it is digested.

It is possible that waste water streams will comprise small amounts of solid material is difficult or impossible for the system to process (e.g. household waste water may comprise grit contained within soil washed out of clothing, or fragments of plastic or glass). Such solid material will generally become trapped within the milling unit 108 and will be emptied out when the system is serviced. Any smaller solid particles which are difficult or impossible to process may progress beyond the milling unit 108, but will become trapped by the activated carbon within the biological water treatment unit and the biological filters. The activated carbon in the biological water treatment unit and in the biological filters is replenished with clean media when the system is serviced.

Over time of use of the system, it has been found that small volumes of minerals (which are one of the end products of the biological processes, along with water and waste gases) accumulate within the activated carbon inside the biological water treatment unit, within the biological filters and within fine sand media within the shoreline mill (mechanical treatment stage). These mineral deposits will be removed from the system when the activated carbon and sand media are periodically replaced when the system is serviced.

By way of Example, a system of the present invention may comprise (in order of arrangement in the system) an inlet module 102, one milling unit 108 with three stages (110a, 110b, 110c), a waste stream sump 116, an equalisation system 124, a biological treatment unit 132, a first clarification/filtration unit 134, a first biological filter 142, a second clarification/filtration unit 144, a holding tank 152, a second biological filter 202, a third clarification/filtration unit 204, a disinfection and storage system 206 and a pressurisation system 208. Various modifications may be made to the described embodiment without departing from the scope of the invention.

EXAMPLES

A system in accordance with the present invention was operated so as to process a test load of domestic waste water at an average of 1500 litres per day, the system having an inlet module, one milling unit with three stages, a waste stream sump, an equalisation system, one biological treatment unit, a settling tank, a biological filter, a holding tank, a disinfection and storage system and a pressurisation system. Tests were performed by Feedwater Ltd, a United Kingdom Accreditation Service (UKAS) accredited laboratory (UKAS organisation No. 2234). Aerobic colony count was determined in the effluent of the system over periods of 68 hours at 22° C. and 44 hours at 37° C. using Feedwater's GAMCO2 standard method, using spiral plate on Yeast Extract Agar. Total coliforms and *E. Coli* removal were determined using Feedwater's GAMC03 standard method. This GAMC03 method is recommended by the Environment Agency of the United Kingdom in their publication 'The Microbiology of Drinking Water', 2009. The results of the analysis carried out by Feedwater Ltd are shown in Table 1 below.

Domestic waste water is recognised as containing very high levels of *E-coli*, aerobic colonies and total coliforms. For example, a study entitled 'Effectiveness of Sewage Treatment Based on Selected Faecal Bacteria Elimination in Municipal Wastewater Treatment Plant in Torun' (Paluszak et al, 2002) found that the influent to the sewage treatment plant serving residential properties showed a high number of *E. coli* bacteria. *E-coli* counts ranged from $4.5 \times 10^4$ to $9.5 \times 10^8$ cells/mL, an average of $3.75 \times 10^6$ cells/mL. In a 'Preliminary Study on the Effect of Wastewater Storage in Septic Tank on *E. coli* Concentration in Summer', Appling (2013) found that Total coliform concentrations in influent flow into a domestic septic tank ranged between 4.76 log MPN per 100 mL up to levels that were above the maximum level of detection (>5.38 log MPN per 100 mL) at the dilution level that was employed during testing (1:100). In 'Detection of *Escherichia coli* in sewage and sludge by polymerase chain reaction', Y L Tsai et al (1993) raw sewage contained *E. coli* $8.6 \times 10^3 +/- 6.0 \times 10^3$ CFU/ml. Given that *E-coli* is a subset of aerobic colonies, which is in turn a subset of total colonies, it can be seen that counts for all of these indicators are very high in all domestic waste-water. 3M™ Petrifilm™ *E. Coli*/Coliform Count Plates were used to test the influent domestic waste water entering the system in accordance with the present invention, and similar *E. Coli* and coliform levels as found in the above studies were confirmed.

TABLE 1

|  | Theoretical Lower Limit of Detection | Number isolated in effluent |
| --- | --- | --- |
| Aerobic colony count (at 22° C./68 Hours) | 20 CFU/ml | 40 CFU/ml |
| Aerobic colony count (at 22° C./44 Hours) | 20 CFU/ml | 40 CFU/ml |
| Total coliforms | 1 CFU/Vol analysed | None Isolated in 100 ml |
| *E. Coli* | 1 CFU/Vol analysed | None Isolated in 100 ml |

The invention claimed is:

1. A biological water-treatment unit for biological treatment of a waste water stream, comprising:
   an inlet for waste water, a reactor, an outlet for purified water, and ventilation means configured to provide ventilation to the reactor, said inlet, reactor and outlet being in fluid communication;
   wherein the reactor is divided into two or more successive compartments by one or more mesh screens disposed along a length of the reactor, wherein each compartment is in communication with the ventilation means, and comprises a biofilm on one or more surfaces, wherein the reactor further comprises a powder or granular substrate of biofilm growth that is heavier than water, said substrate being substantially contained in each compartment within the reactor by the one or more mesh screens; and
   wherein the reactor is configured to expose at least a portion of the waste water to the biofilm in the presence of air supplied to above the waste water stream by the ventilation means, thereby biologically treating the waste water stream into purified water;
   wherein the reactor further comprises a rotating drum which comprises the two or more compartments, said rotating drum being configured to rotate so that a film of the waste water is formed on at least a portion of the reactor and the mesh screen as they rotate through and out of the waste water stream, thereby exposing the film to air above the waste water stream supplied by the ventilation means; and
   wherein at least a portion of an inner surface of the rotating drum is adapted to increase the friction between the substrate and the rotating drum such that, in use, rotation of the rotating drum causes at least a portion of the substrate to be raised out of the waste water and into the air supplied by the ventilation means.

2. The biological water-treatment unit according to claim 1, wherein the reactor is cylindrical.

3. The biological water-treatment unit according to claim 1, wherein the reactor is tapered.

4. The biological water-treatment unit according to claim 1, wherein the surface for forming a biofilm is at least one of a portion of the inner surface of the reactor or a portion of the mesh screens.

5. The biological water-treatment unit according to claim 1, wherein the substrate is activated carbon.

6. The biological water-treatment unit according to claim 1, wherein the substrate fills from 40 to 75% of the volume of each compartment.

7. The biological water-treatment unit according to claim 1, wherein the substrate has an average particle diameter of from 0.15 to 5 mm.

8. The biological water-treatment unit according to claim 1, wherein the substrate has a surface area of from 250 to 5000 square meters per gram of substrate.

9. The biological water-treatment unit according to claim 1, wherein the reactor volume is from 1 to 5000 litres.

10. The biological water-treatment unit according to claim 1, wherein the reactor is divided into three or more compartments by two or more mesh screens.

11. The biological water-treatment unit according to claim 9, wherein the mesh screens are progressively finer along the length of the reactor.

12. The biological water-treatment unit according to claim 1, wherein each of the compartments is configured to have a different specialization for processing contaminants within the waste water.

* * * * *